Dec. 7, 1965   B. E. STENTZ   3,222,114
THERMAL BARRIER PARTITION FOR A HOT AND
COLD FOOD SERVICE CART
Filed March 12, 1963   2 Sheets-Sheet 1

INVENTOR.
BLAIR E. STENTZ
BY Owen & Owen
ATTORNEYS

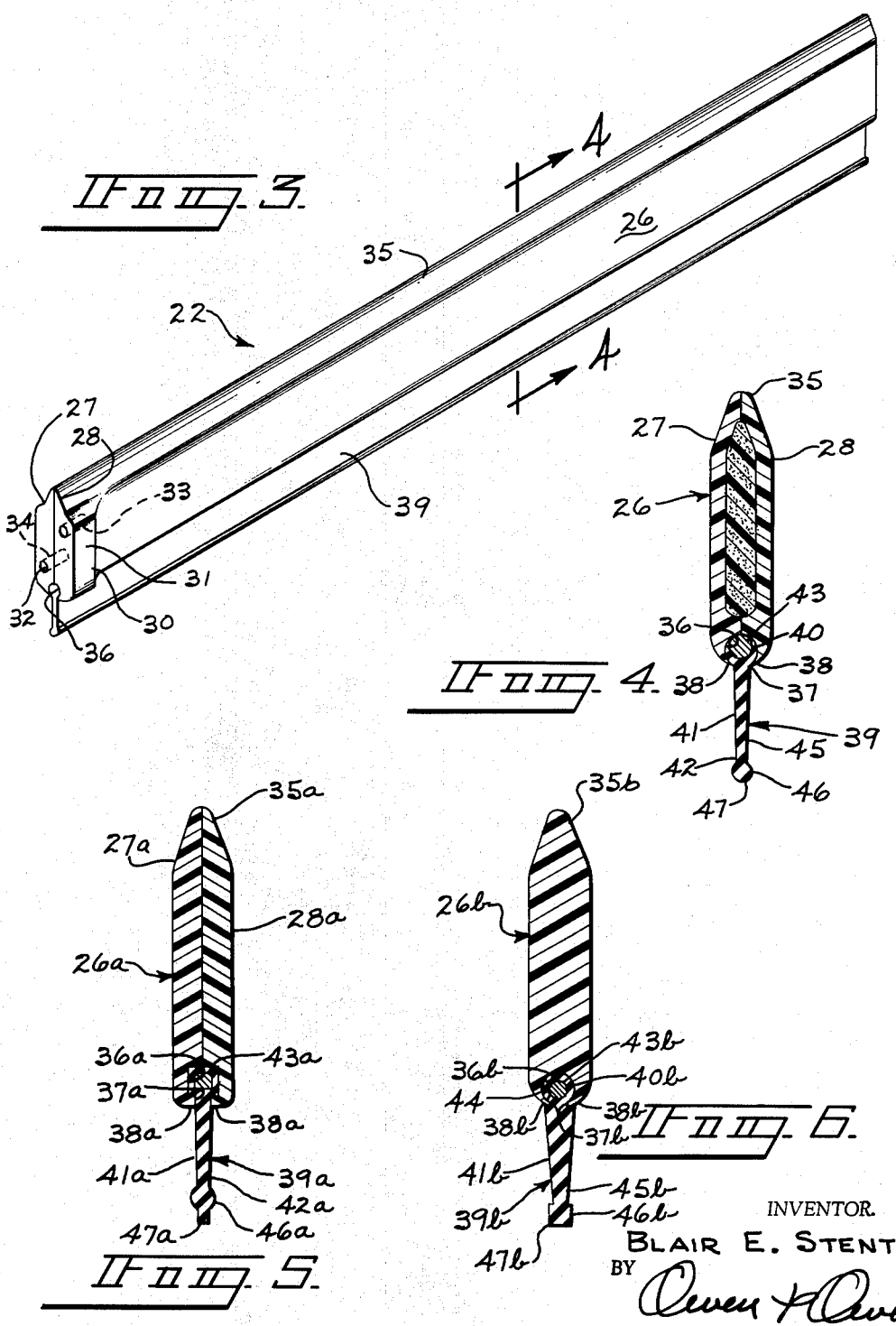

United States Patent Office 3,222,114
Patented Dec. 7, 1965

3,222,114
THERMAL BARRIER PARTITION FOR A HOT AND COLD FOOD SERVICE CART
Blair E. Stentz, Murfreesboro, Tenn., assignor to United Service Equipment Co., Inc., Palmer, Mass., a corporation of Delaware
Filed Mar. 12, 1963, Ser. No. 264,584
1 Claim. (Cl. 312—214)

This invention relates to an improved thermal barrier partition for use in a hot and cold food service apparatus.

In a co-pending application of Stentz and Conklin, Serial No. 846,159, filed October 13, 1959, there is disclosed a hot and cold food service cart having one or more compartments, each of the compartments being divided into two zones, and having means for supporting a plurality of trays in the zones with each tray having a hot portion and a cold portion upon which foods at the respective temperatures are placed. The trays are inserted into the compartment or compartments where their corresponding hot or cold portions are in the proper temperature zones.

In a co-pending application of Stentz, Serial No. 154,005, filed November 21, 1961, there is disclosed a tray support and heat barrier assembly which functions to divide the compartments in a hot and cold food service cart into its two temperature zones whether or not trays are present in the compartment. The assembly disclosed in the co-pending application also functions as a support for the trays in such a compartment.

It is the principal object of the instant invention to provide an improved thermal barrier partition, a plurality of which are used in a walled tray compartment of a food service apparatus, which divides a walled tray compartment of a food service apparatus into separate temperature zones.

It is a further object of the instant invention to provide an improved thermal barrier partition having a flap or gasket which is displaced by the insertion of a tray into the tray compartment of a food service apparatus and in which the flap or gasket readily can be removed and replaced when it is worn or damaged, without the necessity of disassembling the tray support and heat barrier assembly.

Still another object of the instant invention is to provide a thermal barrier partition which reduces the possibility of "short circuiting" of thermal currents between the hot and cold zones of the walled tray compartment.

These and other more specific objects and advantages of the invention will be better understood from the specification which follows and from the drawings in which:

FIG. 3 is a view in perspective of a thermal barrier partition according to the instant invention;

FIG. 4 is a vertical sectional view taken along the line 4—4 of FIG. 3 and shown on an enlarged scale;

FIG. 5 is a vertical sectional view, similar to FIG. 4, showing a modified thermal barrier partition constructed according to the invention; and FIG. 6 is a vertical sectional view, similar to FIGS. 4 and 5, and illustrating still another modification of a thermal barrier partition constructed according to the instant invention.

Briefly, the present invention is an improved thermal barrier partition for use in a hot and cold food service cart. The partition comprises a structural support member which is secured to a removable riser assembly as disclosed in the co-pending application of Stentz, Serial No. 154,005, or the support member can be fastened directly to the rear wall of the food cart. A reinforced flap is slidably engaged with the support member and functions as a gasket to reduce "short circuiting" of thermal air currents between the hot and cold temperature zones of the food service cart. The flap member has a reinforced upper portion, a downwardly tapered body portion or section, and a lower portion having an integral rib located thereon.

Figure 1:
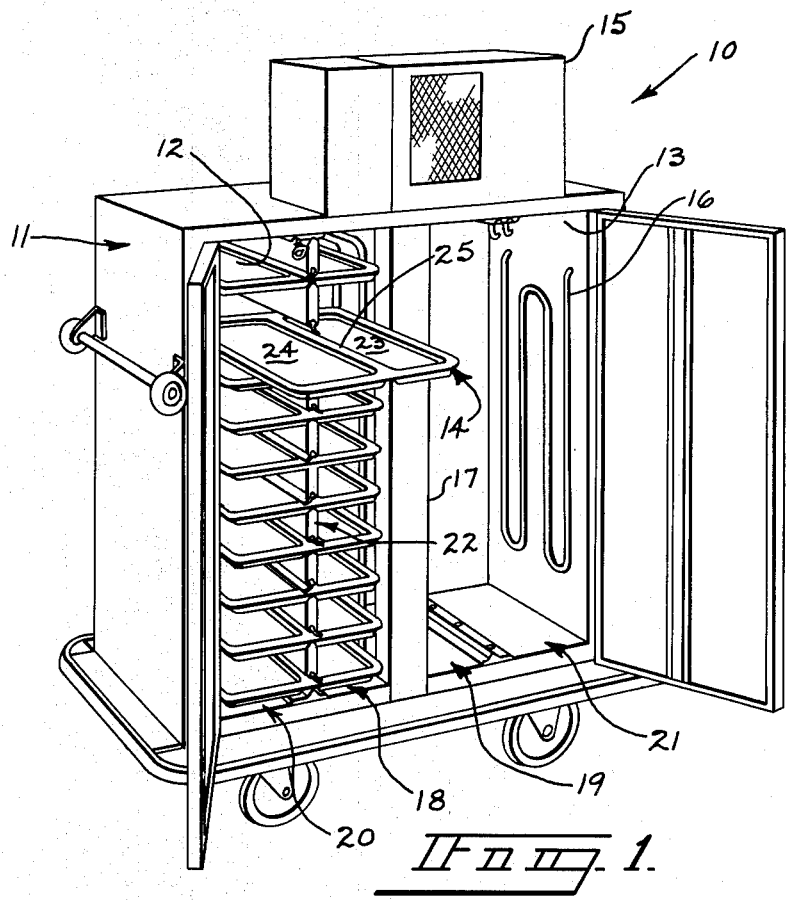
FIG. 1 is a front view in perspective of a food service cart showing two adjacent compartments, each designed to contain a plurality of trays which are divided into two temperature zones by thermal barrier partitions according to the instant invention and showing a thermal barrier in place in only one of such compartments.

Three preferred embodiments of the invention are shown in the drawings with a food cart generally indicated by the reference number 10 in FIG. 1. The food cart is of the general type disclosed in the above-mentioned Stentz and Conklin application (Serial No. 846,159). The food cart 10 has a rectilinear housing 11 which is divided into two compartments 12 and 13, each compartment functioning to receive a plurality of food trays 14. The food cart 10 has a suitable refrigeration mechanism mounted, for example, within a housing 15 and two heating coils 16, one of which is located in each of the compartments 12 and 13, preferably on the sidewalls of the housing 11. A single refrigerator-evaporator (not shown) is positioned within the fixed center partition 17, which separates the housing 11 into the compartments 12 and 13, and provides for the establishment and maintenance of central cold zones 18 and 19, which are located adjacent to the center partition 17. The heating coils 16 provide for the establishment and maintenance of outer hot zones 20 and 21, which are normally adjacent to the sidewalls of the housing 11.

A plurality of thermal barrier partitions 22, according to the instant invention, are spaced in vertical alignment between the hot and cold zones of each of the compartments 12 and 13 and provide a thermal barrier between the respective hot zones 20 and 21 and cold zones 18 and 19 whether the trays 14 have been removed or are still in place.

In the arrangement illustrated in FIG. 1, the food trays 14 are supported by a tray support and thermal barrier partition assemblies with their cold portions 23 in the central part of the housing 11 which is maintained at a cool temperature by the refrigeration unit, for the placement and storage of cold foods. The hot portions 24 of the food trays 14 are located in one or the other of the outer hot zones where the higher temperature is maintained by the heating coils 16.

Each of the food trays 14 has an integral, longitudinally extending rib 25 which separates the cold portion 23 from the hot portion 24.

Figure 2:
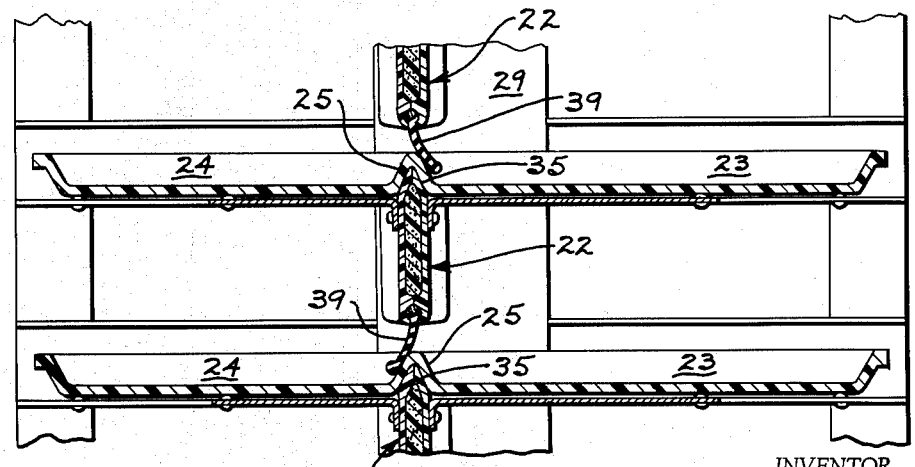
FIG. 2 is a fragmentary, vertical, sectional view showing a tray support and heat barrier assembly, including thermal barrier partitions according to the instant invention.

Referring to FIGS. 3 and 4, the thermal barrier partition 22 comprises a semi-rigid support member 26 which is preferably fabricated from two mating hollow halves 27 and 28 fastened together along the vertical median plane. Each of the hollow halves 27 and 28 is molded of a synthetic resinous material, for example a phenolic composition, which has sufficient structural strength so that the support member 26 can be secured to a riser 29 (FIG. 2) or directly to the rear wall of the housing 11. The hollow interior of the support member 26 may be filled with a "foamed-in-place" resinous foam which serves as a further insulator to reduce heat transfer between the cold and hot portions 23 and 24 of the food tray 14.

The support member 26 has a "thickened" end section 30. Tapped holes 31 and 32 are located in one end of the support member 26 and extend into the "thickened" portion of the "thickened" end section 30. Metal threaded inserts 33 and 34 are inserted and secured within the tapped holes 31 and 32. The threaded inserts 33 and 34 provide mounting means for securing the support member 26 to the riser 29 or to the rear wall of the housing 11. After the support member 26 has been attached to the riser 29 or to the housing 11, it acts as a cantilever beam for supporting the food trays 14.

The support member 26 has an upwardly protruding rib 35 on its upper edge and a longitudinal slot 36 is provided along its lower edge. The longitudinal slot 36 has a restricted opening 37 which is defined by inwardly extending lips 38 of the support member 26.

The rib 35 located on the top edge of the support member 26 snugly fits the inner, underside of the tray rib 25 which is preformed in the food trays 14. A flap 39, of such vertical length as to overlap the upper surface of the support member rib 35 on the next lower one of the thermal barrier partitions 22 when no food tray 14 is interposed therebetween, is slidably engaged within the longitudinal slot 36 located in the support member 26. The flap 39 is formed from an elastomeric material and comprises an upper portion 40, a body portion 41, and a lower portion 42.

Referring to FIG. 4, a reinforcing bar or rod 43 is "Parkerized" and the upper portion 40 is bonded to the reinforcing rod 43 in a molding process which is commonly carried on in the rubber industry. The reinforcing rod 43, in this embodiment, is located in the top part of the upper portion 40 of the flap member 39. The upper portion 40, which contains the reinforcing rod 43, is slidably engaged within the longitudinal slot 36 and is restricted from downward movement by the retaining lips 38 of the support member 26. The flap 39, containing the reinforcing rod 43, can be readily moved from the support member 26 when the flap becomes worn or damaged without the necessity of removing the entire thermal barrier partition 22 from its respective food tray compartment. The longitudinal slot 36, as depicted in FIG. 4, has a circular transverse cross section and the upper portion 40 of the flap 39 has a similar transverse circular cross section.

Referring to FIG. 5, which depicts another embodiment of the instant invention, a support member 26a has a downwardly opening longitudinal slot 36a along its lower edge. The longitudinal slot 36a has a "T" shaped transverse cross section and an upper portion 40a of a flap 39a has a similar "T" shaped transverse cross section. A rectangularly shaped reinforcing rod 43a is located co-axially with the longitudinal axis of the top part of the upper portion 40a of the flap member 39a.

Still another embodiment of the instant invention is shown in FIG. 6. In this embodiment, a support member 26b has a downwardly opening longitudinal slot 36b along its lower edge. The slot 36b has a substantially circular transverse cross section. Lips 38b of the support member 26b are slidably engaged in longitudinal recesses 44 and 45 which are provided in an upper portion 40b of a flap 39b.

As shown in FIG. 4, the body portion 41 of the flap 39 is tapered from the upper portion 40 to the lower portion 42, whereby the transverse width of the body portion 41 converges inwardly. The lower portion 42 of the flap 39 has an integral longitudinal rib 46 located thereon, which in one embodiment has a circular cross section. However, the rib can also be rectangular in cross section (rib 46b, FIG. 6). The rib 46 can be located along the bottom edge of the lower portion 42 of the flap 39, as shown in FIG. 4, or it can be spaced upwardly from a lower edge 47 of the lower portion 42. For example, in FIG. 5 a rib 46a is spaced upwardly from a lower edge 47a of the flap 39a.

The rib 46 reinforces a lower edge 47 of the flap 39. The reinforcement of the lower edge 47 prevents "curling" which is undesirable because it results in heat transfer between the hot and cold compartments of the food carts, thereby reducing the efficiency of the thermal barrier partitions.

While the invention has been disclosed in conjunction with a specific form and disposition of the parts, it should be expressly understood that numerous modifications and changes may be made without departing from the spirit and scope of the appended claim.

I claim:

A thermal barrier partition for a walled tray compartment of a food service apparatus in which a plurality of said thermal barrier partitions are installed in a vertically juxtaposed relationship, whereby in a first position a tray, having a longitudinally extending divider of a predetermined vertical cross-sectional configuration, is inserted between adjacent ones of said thermal barrier partitions and in a second position wherein such tray is removed, comprising in combination, a semi-rigid horizontally elongated support member, said support member having on its top edge an integral tray rib, having a vertical cross-sectional configuration complementary with such predetermined vertical configuration of such tray divider, and defining at its lower edge a downwardly opening longitudinal slot having a restricted opening, an elongated resilient flap member comprising a vertically extending body section having an enlarged upper portion, a longitudinally extending reinforcing member located in said upper portion, said enlarged upper portion being slidably engaged within said longitudinal slot in said support member, said body section being inwardly and downwardly tapered from said upper portion to a lower portion, said lower portion having an integral rib located thereon, said resilient flap having a vertical length greater than the distance defined between the uppermost point on said integral tray rib of said support member and a lower edge of an upper adjacent thermal barrier partition, whereby in such first position said flap engages the tray rib of an adjacent thermal barrier partition and in such second position said flap engages the longitudinal extending divider of an adjacent tray, and mounting means at one end of said support member for securing said support member to said walled tray compartment.

References Cited by the Examiner

UNITED STATES PATENTS

| | | | |
|---|---|---|---|
| 417,178 | 12/1889 | Hartley | 20—65 |
| 1,577,542 | 3/1926 | Rosenblatt | 20—65 |
| 2,845,780 | 8/1958 | Conklin | 312—236 X |
| 3,042,384 | 7/1962 | Bauman | 312—236 X |
| 3,129,041 | 4/1964 | Traycoff | 312—351 X |

FOREIGN PATENTS

| | | |
|---|---|---|
| 632,795 | 12/1961 | Canada. |
| 662,455 | 5/1963 | Canada. |
| 326,311 | 3/1930 | Great Britain. |

FRANK B. SHERRY, *Primary Examiner.*

CHANCELLOR E. HARRIS, *Examiner.*